United States Patent [19]

Kramer

[11] Patent Number: 5,413,978
[45] Date of Patent: May 9, 1995

[54] CATALYTICALLY INERT PARTICLES FOR BLENDING WITH PETROLEUM CRACKING CATALYST

[75] Inventor: Larry J. Kramer, Tallahassee, Fla.

[73] Assignee: Engelhard Corporation, Iselin, N.J.

[21] Appl. No.: 160,000

[22] Filed: Nov. 30, 1993

[51] Int. Cl.$^6$ ............................................. B01J 21/16
[52] U.S. Cl. .......................................... 502/80; 502/68
[58] Field of Search .................................... 502/80, 68

[56] References Cited

U.S. PATENT DOCUMENTS

| | | | |
|---|---|---|---|
| 2,665,259 | 1/1954 | Buffett | 252/449 |
| 3,244,635 | 4/1966 | Duke | 502/80 |
| 3,658,459 | 4/1972 | Gartlan | 502/80 |
| 3,872,175 | 3/1975 | Robota et al. | 502/80 |
| 4,339,352 | 7/1982 | Pitts et al. | |
| 4,465,779 | 8/1984 | Occelli et al. | |
| 4,490,902 | 1/1985 | Eytcheson et al. | |
| 4,493,902 | 1/1985 | Brown et al. | |
| 4,515,903 | 5/1985 | Otterstedt et al. | 502/68 |
| 4,781,818 | 11/1988 | Reagan et al. | |
| 4,987,106 | 1/1991 | Mizutani et al. | 502/80 |
| 5,008,226 | 4/1991 | Taylor et al. | |
| 5,008,227 | 4/1991 | Taylor et al. | |
| 5,082,814 | 1/1992 | Stockwell et al. | |

*Primary Examiner*—Asok Pal
*Attorney, Agent, or Firm*—Inez L. Moselle

[57] ABSTRACT

A method for converting attapulgite clay which has never been heat treated sufficiently to destroy the natural colloidal properties of the clay to attrition resistant, low surface area, essentially catalytically inert particles adapted for use as a blending agent with particles of active zeolitic cracking catalyst. The clay, preferably mixed with an alkaline cementitious material (such as, for example, portland cement or sodium silicate) is sintered at a temperature above 1350° F., preferably in the range of 1500° F. to 1800° F., to reduce surface area to a value below about 15 m$^2$/g, preferably below 5 m$^2$/g, and decrease apparent bulk density to a value below 1.1. The material is sized to form an essentially dustless, free flowing powder.

18 Claims, No Drawings

3,413,978

CATALYTICALLY INERT PARTICLES FOR BLENDING WITH PETROLEUM CRACKING CATALYST

BACKGROUND OF THE INVENTION

This invention relates to essentially catalytically inert mineral-based particles that are adapted to be blended with particles of active cracking catalyst, particularly highly active fluidizable cracking catalysts, to adjust activity and selectivity of the particles of active catalyst to desired levels when the catalyst is used to crack oil feedstocks. The invention also relates to the manufacture of such catalytically inactive material by sintering attapulgite clay, preferably in admixture with an alkaline cementious material such as portland cement or sodium silicate.

Active fluid zeolitic cracking catalysts (FCC catalysts) are frequently utilized in oil refineries in the form of blends with fluidizable essentially catalytically inert microspheres. Reference is made to commonly assigned U.S. Pat. No. 4,493,902. The inert particles are employed to adjust activity (or activity and selectivity) of the active cracking component. Past practice was to produce the blending component by spray drying a slurry of refined kaolin clay to produce microspheres and then calcining the microspheres to dehydrate the clay. One type of inert kaolin microspheres is calcined at about 2100° F.; the product typically has a BET surface area of 5–10 $m^2/g$ and an attrition index (using the EAI procedure) of about 1%/sec. Another type of inert microspheres is calcined under more severe temperature, e.g., 2300° F. and has an EAI below 1%/sec and lower surface area, e.g. below 5 $m^2/g$. Low surface area is a characteristic of material having low catalytic cracking activity. Reference is made to commonly assigned U.S. Pat. No. 4,781,818, especially col. 27. It has also been proposed to dilute an active cracking catalyst with a magnesium containing clay, such as attapulgite or sepiolite, for metals control during the cracking operation. See U.S. Pat. No. 4,465,779.

The manufacture of fluid cracking catalysts, including the production of blending component, utilizes premium quality refined kaolin clays and is carried out on an extensive scale. One result is a dwindling of the formerly vast reserves of kaolins. Unfortunately, kaolin clay ores are not suitable sources for the production of fluidizable blending agents without extensive wet processing steps such as degritting, particle size classification, spray drying and calcination. All of these steps, especially spray drying and calcination, are costly. The kaolin ore cannot simply be mixed with water to a plastic consistency, formed into particles by extrusion, dried, calcined and crushed to a suitable size to produce attrition-resistant blending particles.

Attapulgite type clays are naturally active, high surface area absorptive clays which normally are not interchangeable with kaolin clay. It is common practice to improve the natural absorbency of attapulgite clay by controlled crushing, extrusion, drying, milling, and similar processing. Depending upon the severity of drying, the colloidal properties of the crude clay are reduced or destroyed. Heat activated grades are adapted, among other uses, as floor cleaners and cat litters.

U.S. Pat. No. 2,665,259, assigned to a predecessor of the subject patent application, teaches that a more highly absorptive, lower bulk density and relatively hard material may be formed by compounding an attapulgite type clay, especially Georgia-Florida fuller's earth, which has not been dried to a V.M. content below 10%, with a basic cement such as portland cement. A mixture of attapulgite clay, cement and water is extruded and the extrudate is heated under relatively mild conditions such as those normally used to produce sorbent grades. Mixtures of portland cement and sodium silicate are disclosed. It has also been proposed to add a minor amount of sodium silicate to attapulgite clay to reduce the temperature at which sorptive products can be obtained. (See U.S. Pat. No. 4,339,352, commonly assigned).

Heat activated attapulgite clay has catalytic cracking activity, as would be expected from its high surface area (e.g., 60–110 $m^2/g$); however, the selectivity is undesirable. In U.S. Pat. No. 4,465,779 (supra) high surface area forms of clays are used as diluents. For example, the surface area of the attapulgite was 66 $m^2/g$ and the diluent was catalytically active. While attapulgite clay is in relatively abundant supply, it is not used in present day catalyst manufacture, nor is it used to manufacture an inert binding material for use in catalytic cracking.

SUMMARY OF THE INVENTION

I have discovered a method for converting attapulgite clay which has never been heat treated sufficiently to destroy the natural colloidal properties of the clay to attrition resistant, low surface area, essentially catalytically inert particles adapted for use as a blending agent with particles of active zeolitic cracking catalyst. In accordance with my invention, such clay, preferably mixed with an alkaline cementitious material (such as, for example, portland cement or sodium silicate) is sintered at a temperature above 1350° F., preferably in the range of 1500° F. to 1800° F., to reduce surface area to a value below about 15 $m^2/g$, preferably below 5 $m^2/g$, and decrease apparent bulk density to a value below 1.1. The material is sized to form an essentially dustless, free flowing powder.

In a preferred embodiment of the invention, particles of blending material suitable for use with FCC particles are produced without a spray drying step. Most preferably, the clay and water, preferably mixed with cement, are extruded and the extrudate is crushed and sized before or after sintering. Although this preferred simple, flexible process does not utilize a spray drying step, it yields a catalytically inert powder having requisite physical properties.

Some advantages of the nonspraying process over the prior art spray drying process utilizing an all hydrous kaolin clay feed are: lower cost; flexible chemical composition resulting in flexible physical property as well as chemical properties and a lower calcination temperature. Further, the processing provides a means to adjust particle hardness and density by variation of sintering temperature and selection of cement type and quantity.

The post milling and classification operation can provide a narrower size distribution than is achievable by conventional spray drying which inherently results in a wide range of particle sizes. The process of this invention avoids the capital and energy costs of spray drying microspheres.

DESCRIPTION OF PREFERRED EMBODIMENTS

A key parameter of the processing is the final calcination temperature, which is used to sinter the particles of attapulgite clay. High calcination temperature, e.g., up to 2000° F., can be employed but is not preferred because of economic reasons. On the other hand, when temperature is too low, bulk density and hardness are adversely affected. It is believed that collapse of the crystal structure of the attapulgite is responsible at least in part for the remarkably low surface area and relatively high bulk density of the products of this invention. This collapse occurs at temperatures above about 1350° F.

The process of this invention departs from the prior art concept of adding alkaline cementitious material to attapulgite clay to increase absorbency or to achieve absorbency at lower calcination temperature or to use high surface area forms of attapulgite clay which participate in the cracking reaction.

In typical practice of this invention on a commercial scale, uncalcined run-of-mine crude attapulgite clay, which may have a VM of about 50%, is broken up in a suitable mill such as a hammer mill to particle in the size range of about 2 to 4 (U.S. Sieve). The milled clay is mixed with water and cementitious material. The order of addition of materials is not critical. The ingredients can be charged to a conventional pug mill for mixing. A typical mixture based on a cement binder contains 68% by weight attapulgite, 22% water and 10% portland cement. The pasty mixture from the pugmill may be charged immediately to a conventional extruder, for example, an extruder with $\frac{1}{4}''$ to $\frac{3}{8}''$ holes to form "noodles". The noodles are cut into pellets, typically $<\frac{1}{2}$ to $\frac{3}{4}''$ long. The pellets are dried in a tunnel dryer at 400°–900° F. The dry pellets are then calcined in a conventional calciner at a temperature in the range of 1500° F. to 1800° F., usually about 1600° F. for 2 to $2\frac{1}{4}$ hours. The V.M. of the sintered product is essentially zero. The calcined pellets are ground and classified in a Raymond mill equipped with a whizzer separator. Particles larger than 120 microns are recirculated to the Raymond mill. The minus 120 micron fraction discharged from the separator is passed through an air classifier to remove ultrafine particles (e.g., particles finer than 20 microns). These fines are removed because, if present in the product, could interfere with the fluidization of circulating catalyst inventory in an FCC unit. If minus 20 micron material is not generated during milling, the material does not need to be processed in a classifier. If iron content is sufficiently high to result in a product that promotes oxidation of carbon monoxide when the product is used in a FCC unit, the ground material is passed to a magnetic separator which can be of the high intensity type used by the kaolin industry if the iron is paramagnetic. If the iron is magnetic, separators operating with lower field strengths are suitable.

The following are desired physical properties of the dustless, free flowing products of the invention.

|  | RANGE | PREFERRED |
| --- | --- | --- |
| EAI, % | less than 1%, | 0.20% to 0.80% most preferably 0.30 to 0.50 |
| Apparent bulk density, #/ft³ g/cc | 0.5 to 1.1 g/cc | 0.7 to 0.9 |

-continued

|  | RANGE | PREFERRED |
| --- | --- | --- |
| Total surface area m²/g (BET, nitrogen) | less than 20 m²/g | less than 15 m²/g, most preferably <5 m²/g, e.g. 2m²/g. |
| Roller attrition index | below 10% by weight | 6 to 8% by weight |

Typically, total volume of pores having a radius in the range of 40–20,000 A° is below 0.12 cc/gm.

Preferably there is no measurable catalytic activity or selectivity as measured by a conventional MAT test.

The clays which are suitable for producing the improved inert blending component in accordance with this invention are those of the attapulgite type (e.g., Georgia-Florida fuller's earth). Typical properties of attapulgite clays useful in practice of this invention appear in U.S. Pat. No. 5,008,227 (commonly assigned). Mixed attapulgite/bentonites such as described in U.S. Pat. No. 5,008,226 may also be employed. The attapulgite clay should contain at least about 10% by weight of the mineral attapulgite. Common impurities, in addition to bentonite, may be present.

The clay should be one that has not been dried to a VM below about 10%, i.e., the clay should possess colloidal (gel-forming) properties. Thus, raw crude clay or products supplied as RVM (regular volatile matter) grades can be used. An example is by-product RVM fines. Activation of attapulgite clay occurs when the clay is calcined to a V.M. below about 10%. This takes place when this type of clay is heated to a constant weight at temperatures above about 350° F. Activation destroys the inherent colloidal properties of attapulgite clay and renders it less suitable than other attapulgite clay in practice of the present invention.

Sodium silicate or a natural cement, a pozzolonanic cement, or portland cement, or any other common type of cement that is basic when added to water may be employed to improve the attrition resistance of the catalytically inert particles produced by sintering attapulgite clay. Other alkaline cementitious materials which may be used include calcium oxide, magnesium oxide, common limes, and hydraulic limes. When using sodium silicate, sodium disilicate or O ® brand or N ® brand sodium silicate solutions are satisfactory. Mixtures of two or more cementitious materials can be employed.

The attapulgite clay starting material should have a bulk density of at least about 30 pound/cu. ft. The desired properties of the end product may not be achieved when the attapulgite clay that is employed as a starting material has a low density, i.e., 26 pounds/cu. ft.

The cementitious material and attapulgite clay are added together in amounts such that the ratio of clay to cementitious material is in the range of from 99:1 to 50:50 Water is then added to the mixture to raise the V.M. content thereof to a value at which the mixture can be extruded, typically at least 60%. In some cases addition of water in stages is recommended. The clay and cementitious material can be mixed in the dry form or in the presence of only a small amount of water provided appropriate mixing equipment is available. A pugmill is not satisfactory for mixing dry or nearly dry materials.

Following the pugging step, it is preferable, although not necessary, to extrude the mixture by means of any commercial extruder. The primary purpose of extrusion is to form the material into a convenient shape for drying; therefore extrusion may be eliminated if desired. If the material is to be extruded, however, it is preferable that the V.M. content of the clay-cement mixture be at the highest value consistent with the extrusion operations and with the ready handling of the material. Thus, the amount of water added to the mixture should be as high as possible without making the mixture too soft for handling and extrusion. This condition may be readily determined by experimentation. When not enough water is added an extrudable mix is "crumbly". The proper amount of water is determined by smooth extrusion at optimum extruder electrical load (measured by watts).

The extrudate can be aged before drying for a period of a few hours up to two days or more. However, practice of the invention does not call for aging sufficiently to cause the cement to set.

Prior to calcination the mixture can be placed in a drier or kiln and dried preferably under mild drying conditions at a temperature, for example, of about 500° to 750° F. and for a period sufficient to reduce the V.M. content of the mixture to the desired level, e.g. 5 to 10%. Alternatively, the mixture can be calcined at 1350° F. or higher without a preliminary drying step to sinter clay or clay/cement mixture.

While compositions of the invention are formed from mixtures consisting essentially of attapulgite clay, water and preferably cement, other materials can be present. One example is kaolin clay which can be incorporated in an amount corresponding to about 25% to 50% based on the weight of the attapulgite clay (all clay weights being expressed on a dry, i.e., moisture-free weight basis). Particulate alumina, silica, magnesium oxide and mixtures thereof can be added. For example, a product having acceptable bulk density and hardness and containing over 20% MgO was achieved by extrusion of a mixture of attapulgite clay, portland cement, magnesium oxide, and water, in weight ratios of 76%, 12%, 12%, and a variable amount, respectively, followed by pugging, extrusion, drying, calcination at 1600° F., grinding and classification.

An organic material can be used as the sole binder or as a co-binder. An example is polyvinyl alcohol (Elmer's glue).

Essentially catalytically inert products of the invention are blended with particles of active cracking catalyst, e.g., the high activity catalyst particles produced in accordance with the teachings of U.S. Pat. No. 4,490,902. Proportions of catalytically inert to active particles range from 5:95 to 95:5, usually 30 to 70, and vary with the activity of the cracking component and with the mode of operation of the FCC unit in which the blend is cocirculated.

Products of the invention have the potential to trap vanadium contained in oil feedstocks and/or to abate SOx emissions from the regenerator of a catalytic cracking unit.

DETAILS OF TEST PROCEDURES USED HEREIN

Procedures employed to determine the V.M., F.M. and L.O.I content of the various clays and mixtures are set forth in U.S. Pat. No. 5,008,227.

Fluidization can be evaluated by the procedure "Troubleshooting FCC Unit Circulation and Fluidization Problems" available from Engelhard Corporation.

Surface area (BET) is determined by conventional nitrogen adsorption using a Micromeritics Digisorb 2500 Automatic Multi-Gas Surface Area Analyzer. Before being tested for surface area, the material is heated under vacuum at about 250° C. for 2 hours. (The vacuum bake out is part of analyzer's computer controlled operation.)

Engelhard Attrition (EAI) and the MAT tests are described in detail in U.S. Pat. No. 4,493,902.

The revised Engelhard method for the Roller Attrition Test is described in detail in U.S. Pat. No. 5,082,814.

Apparent bulk density of the particles is determined by a procedure essentially the same as that described in ATP-L-3345, below, except that 100 ml of sample was used and 5000 taps were employed.

I. Scope:
   Determination of the weight of a known volume of catalyst. Whereby a cylinder of known volume is filled without packing, in a freely settled state.
II. Summary:
   The apparent bulk density (ABD) is the weight per unit volume (g/ml) of the catalyst.
III. Reference Documents:
   1. ATP-L-C001—General Laboratory Calibration Procedure
   2. ATP-L-C151—Calibration of APD Cylinder
   3. Menlo Method=3345
   4. ATP-L-D100—Quality Records
   5. ATP-L-C106—Analytical Balance Calibration Procedure
IV. Apparatus/Equipment:
   1. Ring Stand
   2. Ring Clamp
   3. Burette Clampholder
   4. 60° Short Stem Funnel
   5. 50 ml Porcelain Crucible
   6. Balance, Sensitivity 0.1 gram
   7. Spatula
   8. Graduate Cylinder: Calibrated at 25 ml
   9. Spacer (15 mm)
V. Reagents:
   None
VI. Safety:
   1. General laboratory safety requirements and practice must be followed.
   Microspheres
      NOTE: Spread as is. Equilibrate for 24 hours. Run the equilibrate material the same as listed above.
VIII. Calculation:

$$ABD\ (G/ML) = \frac{\text{wt. of cylinder} - \text{sample} - \text{wt. of cylinder}}{\text{cylinder volume (ml)}}$$

IX. Precision and Accuracy Statement:
   Ten replicate determinations were made on an internal reference material (05 120). The average of these determinations was 0.913 with a standard deviation of 0.002
VII. Sample Preparation/Procedure:
   1. Mix sample thoroughly, by inverting sample several times.
   2. Allow samples to sit in the bag for 8 hours. (finished products)

3. Place funnel stem in burette clamp on the ringstand in a vertical position. Weigh the graduate cylinder.
4. Place the graduate under the funnel and adjust to 15 mm using the spacer. Using the 50 ml crucible, pour approximately 30 ml of the FCC sample into the funnel.
5. Fill the cylinder to overflowing and wipe off excess with a straight edge leaving the cylinder filled flush at the top.
   NOTE: Be careful no to jar the catalyst in the cylinder until after the excess has seen wiped off.
6. Brush off any catalyst clinging to the outside of the cylinder.
7. Weigh the sample and graduate and determine the weight of the sample.
8. Repeat the above zest in duplicate. Measurements should not vary more than 0.2%.
9. Apparent bulk density is expressed in gms/ml.

The specific examples below are illustrative of various embodiments of the invention, but are not intended as limiting this invention, as modifications will be readily apparent to those of ordinary skill in the art.

The attapulgite crude clay used in illustrative examples was mined from a mine located near Quincy, Ga. The particular batches of attapulgite clay material used in the specific examples were withdrawn from time to time as needed from regular commercial lots of a designated ore type, Type A. Type A crude is the source material for various commercial attapulgite products in absorbent applications. The chemical analysis of a typical Type A attapulgite crude from this location is given below in table form; physical characterizations specific to a particular batch of attapulgite crude used in a specific example are set forth in the example.

| Weight percent (VF) | |
|---|---|
| $SiO_2$ | 66.9 |
| $Fe_2O_3$ | 3.0 |
| $TiO_2$ | 0.5 |
| $Al_2O_3$ | 11.9 |
| CaO | 2.6 |
| MgO | 10.4 |
| Undetermined | 4.7 |
| | 100.0 |

The kaolin clay used in some examples was ASP ®400 clay supplied by Engelhard Corporation.

One cementitious material used in an illustrative example was Portland Cement Type I supplied by Bainbridge, Citadel Cement. Another cementitious material used was POR-ROK Quick Dry Anchoring Cement supplied by MINWAX COMPANY INC. Chemical analyses of these cements are provided below. Sodium silicate disilicate solution was used in another example.

| | Chemical Analysis of Cements | |
|---|---|---|
| | Portland Cement | POR-ROK Cement |
| Fe2O3 | 2.87 | 1.66 |
| MgO | 1.34 | 5.53 |
| TiO2 | 0.32 | 0.28 |
| CaO | 63.29 | 18.24 |
| K2O | 0.57 | 0.52 |
| SiO2 | 23.54 | 49.37 |
| P2O5 | 0.24 | 0.58 |
| Al2O3 | 6.89 | 6.67 |
| Na2O | 0.94 | NA |

The compositions described in the samples were made in a laboratory pilot plant using conventional equipment. The general method of making the inert composition included the following steps: The attapulgite crude clay was crushed in a hammermill to particles in the size range of 2 to 4 (U.S. Sieve Size). The constituents were fed into a pug mill and subjected to high shear mixing in the pugger for sufficient time, typically about 15 minutes, to thoroughly mix the constituents into a substantially homogenous plastic mass. The order of addition of materials to the pug mill was clay, cement and ½ of the water. Thereafter, the remaining half of the water was added. The plastic mass was extruded through a die plate with ¼" holes, yielding moist noodles, which were cut into pellets. The extruded pellets were placed in an oven for drying, typically at a temperature of 400° F. for a two hour residence period. The dried pellets were then placed in a muffle furnace for calcination at temperatures and residence time indicated in the examples (typically at temperatures in the range of 1400° to 1800° F.) for 1½ hours.

After calcination, the material was crushed and milled first in a roller mill and then a Raymond mill; the Raymond mill was set for milling to a $-100+325$ mesh size. The milled material was then sized, and the $+325$ mesh fraction was recovered as sample product for further testing.

EXAMPLE 1

In this example a free flowing, dustless inert blending agent was produced from Type A attapulgite crude clay, portland cement and water. The particular batch of Type A attapulgite crude used in the example had the following characteristics:

| Free Moisture | 14.2% |
|---|---|
| Volatile Matter | 44.6% |
| + 200 mesh grit content | 7.5% |
| + 325 mesh grit content | 8.1% |
| CaO content, VF basis | 2.52% |

About 70 pounds of Crushed Type A attapulgite crude were mixed in a pug mill with 11.5 pounds of portland cement and 31.5 pounds of water in two additions to provide a mixture that was wet without being gummy. After extrusion through a die plate, the material was dried in an oven at a temperature of 400° F. for two hours. Subsequently, the material was calcined in a muffle furnace and at a furnace temperature of 1500° F. for 1.5 hours, including 30 minute heat up time. After calcination, the material was crushed, milled, and sized.

The recovered fraction of product had particle size distribution measured as:

| less than 20 microns | 0% |
|---|---|
| less than 40 microns | 3% |
| less than 60 microns | 13% |
| less than 80 microns | 32% |
| average particle size | 100 microns |

Some measures of the characteristics that determine the suitability of a material for use as an inert blending component in a catalytic cracking unit are reported below for the test product of Example 1 and the spray dried calcined kaolin used in commercial blended zeolitic FCC catalysts.

|  | Product Example 1 | Calcined Kaolin |
|---|---|---|
| Physical characteristics |  |  |
| Engelhard Attrition Index | 0.44 | 0.35 |
| Average bulk density (g/cc) | 0.87 | 1.05 |
| Surface Area (m2/g) | 12.0 | — |
| Roller Hardness | 7.4% | 6–8% |
| LOI | 0.4 |  |

EXAMPLE 2

In this example, the materials mixed in the pug mill were Type A attapulgite crude clay (58.4% by weight), portland cement (9.5% by weight), sodium disilicate solution (SDS) (1.2% by weight) and water (30.9% by weight). The SDS solution was 40% active. The particular Type A attapulgite crude batch used in this example had a Free Moisture Content of 40.0% and a Volatile Matter content of 56.0%. After pugging (15 minutes), extrusion and drying (400° F. for 2 hours), the composition was calcined at 1700° F. for 1 and ½ hours. The calcined material was crushed, milled and screened. The +325 mesh fraction was recovered as the test product.

Some physical and chemical characteristics of the Example 2 product are as follows:

| Engelhard Attrition Index | 0.25%/sec |
|---|---|
| Average Bulk Density | 1.07 g/cc |
| $Na_2O$ | 0.58% wt |
| CaO | 17.56% wt |
| Surface Area (m$^2$/g) | 2 |

EXAMPLE 3

In this example, the raw materials used to produce the inert particles were Type A attapulgite crude, kaolin clay, POR-ROK cement, and added water. The amounts of the solid constituents used in test batch were:

| Type A attapulgite crude | 1000 grams |
|---|---|
| Kaolin clay | 575 grams |
| Por-rok cement | 290 grams |

Sufficient water (on the order of about 700 grams) was added to the solids during pugging to achieve a consistency desired for extrusion through the die plate. The material then dried at temperature of 400° F. for 4 hours and then calcined at temperature of 1800° F. for 2 hours. The calcined material was crushed, milled and sized, with the +325 mesh fraction recovered.

Physical characteristics of the Example 3 test product were as follows:

| Engelhard Attrition Index | 0.46%/sec |
|---|---|
| Average bulk density | 0.89 g/cc |
| Average Particle Size | 78.6 microns |

|  |  |
|---|---|
| (not determined) |  |

EXAMPLE 4

In this example, the raw materials used to produce the inert particles were Type A attapulgite crude, SDS solution (40% active) and added water. Sodium disilicate solution was added in amounts corresponding to about one (1) part by weight (anhydrous basis) to 99 parts by weight (dry) of attapulgite crude. Procedures used in previous examples were followed to make the product. Calcination was at 1800° F. for 1½ hours. When 1% sodium silicate was used as the binder, BET surface area was 2 m$^2$/g and the EAI was 0.34%.

For purposes of comparison, the procedure was repeated except that no binder was used. In this case, EAI was 0.55%

EXAMPLE 5

Porosity of typical sintered attapulgite products of the invention was determined by a conventional mercury intrusion method. Results are as follows;

| Cement Pore Radium, A | With Cement (portland) Pore Volume, cc/gm | Without |
|---|---|---|
| 40–600 | 0.058 | 0.007 |
| 600–20 k | 0.052 | 0.036 |
| total | 0.110 | 0.043 |

I claim:

1. A particulate attrition resistant composition of matter suitable for circulating in a fluid catalytic cracking unit with an active cracking catalyst and comprising catalytically inert, fluidzable particles comprising attapulgite clay that has been sintered at a temperature above 1350° F., said particles having a BET surface area below 15 m$^2$/g, an apparent bulk density below about 1.1, and an EAI below 1%/sec.

2. A process for producing a catalyst blending additive comprising mixing attapulgite clay that has never been calcined to a V.M. below about 10% with sufficient water to produce a mixture having an extrudable consistency, extruding said mixture, and calcining said extrudate at a temperature above 1350° F. to reduce the surface area to a value below 15 m$^2$/g and increase bulk density to a value below about 1.1.

3. A particulate attrition resistant composition of matter suitable for circulating in a fluid catalytic cracking unit with an active cracking catalyst and comprising a mixture of attapulgite clay and at least one alkaline cementitious material, said mixture having been sintered at a temperature above 1350° F. and having BET surface area below 15 m$^2$/g and apparent bulk density below about 1.1.

4. The composition of claim 3 which has an EAI below 1%/sec.

5. The composition of 3 wherein said cementitious material is selected from the group consisting of alkaline earth metal silicate, alkaline earth metal oxide, alkaline earth metal hydroxide, alkali earth metal aluminate, alkali metal silicate and mixtures thereof.

6. The composition of claim 3 wherein said cementitious material comprises portland cement.

7. The composition of claim 3 wherein said cementitious material comprises magnesium oxide.

8. The composition of claim 3 wherein said cementitious material comprises sodium silicate.

9. The composition of claim 3 wherein kaolin clay is present in the calcined mixture.

10. The composition of claim 3 wherein said attapulgite clay is a crude unrefined grade.

11. A mixture of particles of active cracking catalyst and the composition of claim 3.

12. A process for producing a catalyst blending additive comprising mixing attapulgite clay that has never been calcined to a V.M. below about 10% with at least one alkaline cementitious material in a clay-cementitious weight ratio of from 99/1 to 40/60 in the presence of sufficient water to produce a mixture having an extrudable consistency, extruding said mixture, and calcining said extrudate at a temperature above about 1350° F. to reduce the surface area of said mixture to a value below 15 $m^2/g$ and increase bulk density to a value below 1.1, and crushing and sizing the calcined extrudate.

13. The process of claim 10 wherein said cementitious material is selected from the group consisting of alkaline earth metal silicate, alkaline earth metal aluminate, alkaline earth metal oxide, alkaline earth metal hydroxide, alkali metal silicate and mixtures thereof.

14. The process of claim 12 wherein said surface area does not exceed 10 $m^2/g$.

15. The process of claim 12 wherein said cementitious material comprises portland cement.

16. The process of claim 12 wherein said cementitious material comprises magnesium oxide.

17. The product of claim 12 wherein said cementitious material comprises sodium silicate.

18. The process of claim 12 wherein kaolin clay is present.

* * * * *